United States Patent
Idskov et al.

[15] 3,637,066
[45] Jan. 25, 1972

[54] CONVEYOR SYSTEMS

[72] Inventors: Arne S. Idskov, Brabrand; Jacob A. Nielsen, Viby J., both of Denmark

[73] Assignee: Crisplant A/S, Bryggervej, Risskov, Denmark

[22] Filed: Dec. 1, 1969

[21] Appl. No.: 881,146

[30] Foreign Application Priority Data

Nov. 29, 1968  Great Britain...............56,746/68

[52] U.S. Cl..................................198/38, 214/11
[51] Int. Cl..................................B65g 47/34
[58] Field of Search............198/32, 75, 79, 80, 155, 38; 214/11 R, 11 A

[56] References Cited

UNITED STATES PATENTS 3,231,066  1/1966  Harrison et al...............198/155
3,409,115  11/1968  Porcaro.........................198/32
3,510,014  5/1970  Speaker et al....................198/155

*Primary Examiner*—Edward A. Sroka
*Attorney*—Craig, Antonelli & Hill

[57] ABSTRACT

A conveyor system primarily for use in automatic sorting systems in which it is desired to transfer articles from a number of feeding stations to a common sorting conveyor with a well-defined transfer time, said conveyor system comprising at least a first and a second conveyor, a partial length of said first conveyor extending closely along a partial length of said second conveyor substantially parallely therewith, said conveyors being driven at equal velocities, and transfer means participating in the movement of the conveyors at least along said partial length and operable to laterally deplace an article from one of said conveyors to the other of said conveyors by a movement substantially perpendicular to the moving direction of the conveyors along said partial lengths thereof.

9 Claims, 3 Drawing Figures

PATENTED JAN 25 1972  3,637,066

INVENTORS
ARNE SCHJOLDAN IDSKOV AND JACOB AUGUST NIELSEN

BY Craig, Antonelli, Stewart & Hill
ATTORNEYS.

CONVEYOR SYSTEMS

The present invention relates to conveyor systems and more particularly to a system for transferring articles from a number of feeding stations to a common conveyor. Still more particularly the invention is concerned with conveyor systems for use in connection with automatic sorting systems of the kind comprising a conveyor with a feeding station from which articles such as post parcels, flight luggage air and rail freight or the like are sequentially fed to the conveyor, means being provided to divert the single articles from the conveyor to one of a plurality of receiving stations along the conveyor in accordance with a destination code setting for each article. In most systems the destination code is set by manually operating the key board of a control box in accordance with a digital destination code appearing in writing or otherwise on the single article as the articles pass the feeding station; the code set, electronically or otherwise, follows the article as it travels along the conveyor and serves to actuate the said diverting means in the receiving station corresponding to the particular destination code. Systems of this kind are known in the art and should, therefore, need no detailed description here.

As described in our copending patent application No. 754,815 it is desirable to work with two or more parallelly arranged feeding stations in order to profit the full capacity of the sorting conveyor, whereby it is essential to ensure that the articles are delivered to the common sorting conveyor at different times, so that two consecutive articles will travel on the common line with a certain spacing in the moving direction. It may also be important to ensure that the travelling time of the articles from the point in which they are released from the feeding station to a common reference point on the sorting conveyor is independent of differences in the actual travelling distance. It is desirable to place the feeding stations side by side in a row perpendicular to the start direction of the sorting conveyor, and for this reason the said travelling distance will be bigger for articles delivered from the outer stations or under circumstances even from the outer side of one station as compared with the distance from an inner feeding station or the inner side of one station.

In the system described in our said copending application the code settings for the articles are adapted to electronically "follow" the articles upon each article release from the feeding stations; the code signals are advanced in a so-called driving register with a speed corresponding to the velocity of the sorting conveyor so as to reach a register unit serving to actuate the said diverting means in a particular receiving station at the moment the article reaches this station. This performance, combined with the requirement of maintaining a desired spacing between consecutive articles irrespectively of the sequence in which they are released from the different feeding stations, makes it desirable to convey all articles with identical speed in the longitudinal direction of the sorting conveyor also during their passage from the areas to the sorting conveyor. As long as there are two parallel feeding stations only, such as disclosed in the prior application with specific reference to the drawings thereof, the problem of the constant longitudinal advancing speed of the articles is easily solved in the manner described therein, i.e., by means of movable sidewalls on a conveyor section between the feeding stations and the sorting conveyor, these walls moving with a velocity having a cross component and a longitudinal component, the latter corresponding to the advancing velocity of the sorter conveyor. The same principle may be used for more than two feeding stations, but in that case such a system is believed to be less accurate, and anyway—also when used for two stations only—it requires a special installation between the delivery end of the feeding stations and the entrance to the sorting conveyor.

It is the purpose of the invention to provide a conveyor system enabling articles from different delivery stations located sideways of the axis of a common conveyor to be transferred to this conveyor with a well-defined travelling time irrespectively of the lateral location of the feeding station. Another purpose is to provide a system in which the transfer means may be built up from components of the same kind as used in the sorting conveyor.

According to the invention each of the feeding stations are connected to the common conveyor by means of a conveyor having a transfer section extending a distance along the common conveyor and moving with the same speed as this latter conveyor, means being provided for laterally deplacing an article on the feeding conveyor without substantially influencing its position thereon in the longitudinal direction, said deplacing means being adapted to move the article from the feeding conveyor to the common conveyor as the article passes along said transfer section. When the two conveyors are moving at the same speed, side by side or otherwise in close relationship, and an article on the feeding conveyor is pushed or otherwise moved laterally off this conveyor onto the other conveyor, this deplacement will take place without any substantial change in the longitudinal moving velocity of the article so that a destination code signal advanced through the said driving register with a speed corresponding to the conveyor velocity will steadily follow the article despite the lateral movement thereof. In this manner feeding conveyors may be placed at both sides of the sorting conveyor, and further feeding conveyors may be placed along the exterior sides of the interior feeding conveyors so as to first deliver the articles moving thereon to the adjacent interior conveyor from which they are thereafter delivered further to the sorting conveyor.

Normally, the sorting conveyor is constituted by moving conveyor elements and provided with the said diverting means at spaced intervals. Several kinds of such means are known in the art, also constructions operable to cause a purely transverse deplacement of the articles relatively to the moving supporting means for the article, for example consisting in a row of tiltable slats moving as an endless belt past the receiving stations. For diverting an article to a selected receiving station it is sufficient to cause the code signal to actuate a slat tilting mechanism when the article passes the station, whereby the article will be tilted off the slat or slats, and, of course, this will be done without any change in the advancing velocity of the article as long as it is still resting or gliding on the slats.

Now, if a diverting system of this kind is used not only for diverting an article to a stationary receiving station, but also for diverting it to another conveyor running along the side of the feeding conveyor it will be appreciated that the article will be transferable from one to another conveyor and conveyed further thereon without any change in its velocity in the longitudinal direction. In this manner articles may be diverted from one to another and thereafter to a third conveyor, and so forth, if desired, and all conveyors may be built up by means of identical components, which is, of course, a considerable advantage in the production and maintenance of the systems.

For transferring the articles from the sorting conveyor to the receiving stations it is necessary to use selectively actuable tilting mechanisms, but for transferring the articles from the feeding conveyor to the sorting conveyor it is sufficient to arrange permanent tilting means for tilting all slats passing the transfer length of the conveyor, since in this case there is no need for a selection of any particular transfer area.

An embodiment of a conveyor system according to the invention, by way of example, is described in the following, reference being made to the accompanying drawing, in which.

Figure 1:
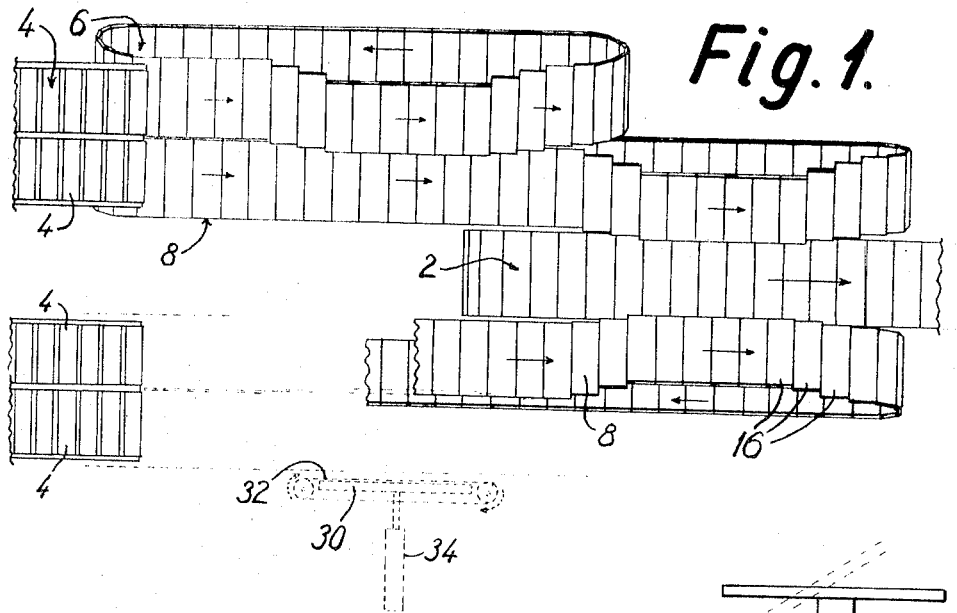
FIG. 1 is a plane top view of the system.
Figure 2:
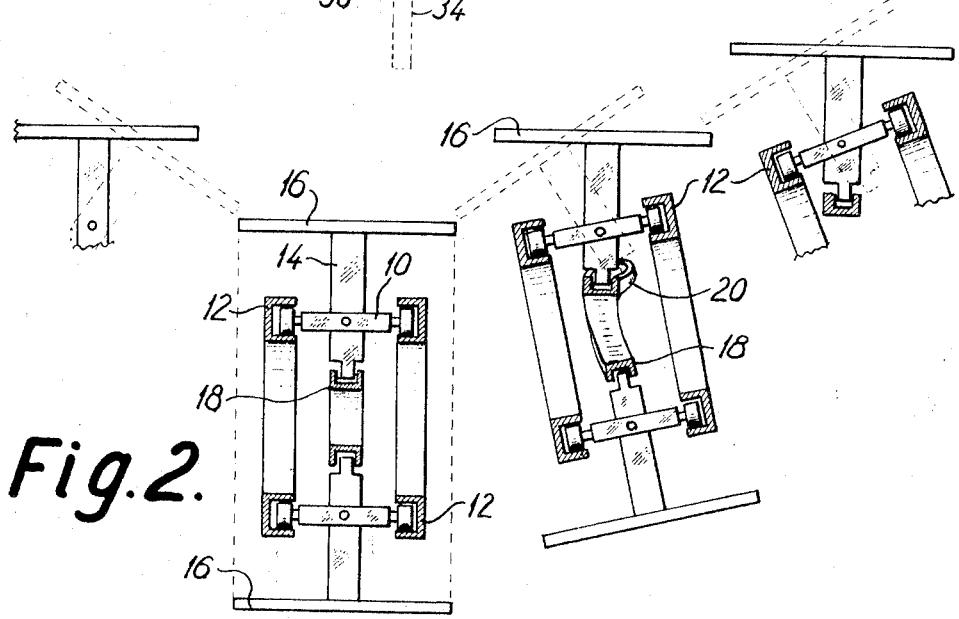
FIG. 2 is a sectional end view thereof.

The system shown in FIGS. 1 and 2 comprises a sorting conveyor 2 and four feeding stations 4, these feeding stations being designed for example as disclosed in our said copending application, i.e., each comprising an accumulation table for several parcels to be sorted according to a code set in a code setting box adjacent each station, release means for releasing the first parcel from the delivery end of the station to a conveyor section in front of the station, and means ensuring that from the several stations there can only be released one parcel at a time, so that consecutive parcels will leave the stations one by one and with a predetermined mutual spacing irrespectively of the sequence in which they leave the single stations.

In front of each feeding station 4 there is located a feeding conveyor 6 and 8 built up from the same components as the sorting conveyor 2, viz as a train of interconnected carrier members 10 moving in guiding rails 12 and each provided with a tiltable supporting post 14 for an upper transverse slat 16, these slats forming kind of an endless belt moved by driving means not shown, but in manner well known in the art, for example as disclosed in the U.S. Pat. specifications Nos. 3,147,845 and 3,233,720. The posts 14 have their lower ends engaged within a control guiding rail 18 so that the transverse location of this rail will control the tilting of the posts 14 and therewith of the slats 16. In the sorting conveyor 2 the rail 18 is connected with switch tracks at each diverting station, these switches being operable by the code settings of the parcels so as to tilt the slats when a particular parcel reaches its destination along the conveyor 2, all this in a manner known per se as far as the conveyor 2 is concerned. It is believed, therefore, that a detailed description of the conveyor construction will not be necessary in the present invention.

The feeding conveyors 6, 8 have an offcentered control rail section 20 situated so as to cause all slats 16 to tilt inwardly along a certain length of the conveyors. The conveyor 8 is mounted somewhat above the conveyor 2 so that parcels will hereby be laterally displaced by sliding down onto the conveyor 2, and correspondingly the outer feeding conveyor 6 is mounted somewhat above the conveyor 8 so that parcels may in the same manner be transferred from conveyor 6 to conveyor 8, and therefrom further to the conveyor 2 as clearly illustrated in the drawing.

It is a special feature of the invention that the conveyors 6 and 8, as most clearly shown in FIG. 2, have their plane of movement somewhat inclined, whereby it is possible to let their upper parts cooperate in the manner described without any space problems being encountered at their lower portions which may be spaced more from each other than the upper portions.

Figure 3:
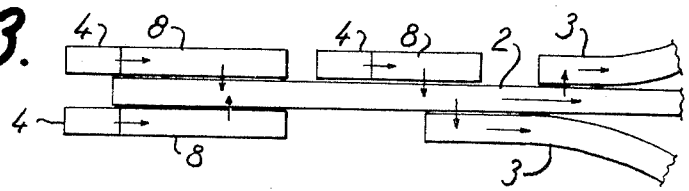
FIG. 3 is a schematical top view illustrating other embodiments of the system according to the invention.

It will be understood that in the manner described there will be no limitation as to the number of parallel feeding stations, and, of course, different feeding stations may also be located after each other in the longitudinal direction of the conveyor 2, as shown in FIG. 3, in which the cross arrows shown indicate the areas and directions of the article transfer. The system according to the invention is primarily intended for use in connection with the feeding of a porting conveyor, but it may also be used for the opposite purpose, i.e., for diverting articles from a main conveyor 2 selectively to several branched off conveyors 3, as also shown in FIG. 3. Thus, the articles fed onto the sorting conveyor 2 may later be diverted not only directly to any of a number of stationary receiving stations, but to one or more additional sorting conveyors 3 each of these for example being adapted to receive all parcels for a certain group of destinations and each provided with receiving stations for the single destinations in the group. An arrangement of this kind will require modifications in the code signal advancing system, but it is very easy to obtain that the code signals follow the parcels also when they are transferred to a branched off sorting conveyor, since a corresponding branching off of the signal to a special driving register for the new conveyor may be carried out in or from the first driving register if the code signal includes a branch control signal. The art of diverting code signals to and from driving registers in accordance with the movement of the articles along different conveyor sections, irrespectively of the articles along different conveyor sections, irrespectively of the mechanical construction of the conveyors, is already highly developed prior to the present invention, and it is not considered necessary, therefore to describe the signal transfer in more detail.

Obviously, the invention is not limited to the use of conveyors of the tiltable-slat type, since nontiltable supporting means for the articles are perfectly usable when other kinds of suitable diverter means are used; the prior art comprises many different kinds of diverter means for conveyors of both the endless-belt type and the driven-roller type, and in cases where the diverter means are operable to unload an article from the conveyor without substantially changing the advancing velocity thereof as long as the article is still advanced by the conveyor, such diverter means will also in general, be applicable for diverting the article to another conveyor according to the principles of the present invention. These diverter means need not necessarily be of the type participating in the movement of an endless conveyor belt in direct association therewith. For example, it is possible to use a stationary pushing member as indicated in dotted lines in FIG. 1, comprising a wall member 30 backing the front side of an endless belt 32 driven with the same speed as the conveyors, the member 30 being laterally movable by means of e.g., a control cylinder 34 so as to be able to push an article onto the neighboring conveyor without changing the longitudinal velocity of the article. A diverter of this kind will be applicable also in connection with conveyors of the driven-roller type.

In our British Priority Pat. application No. 53783/69, filed 3rd Nov. 1969, to which reference is hereby made, is described a conveyor made as an endless belt of elements each comprising a crosswise arranged, endless belt serving directly as horizontal supports for the articles. Subject to their passing of suitable actuation means these belts will start moving so as to move the article crosswise off the conveyor. If two such conveyors are used for the purpose here considered the transfer may be facilitated when also the cross belts of the receiving conveyor are caused to move correspondingly during their passage past the transfer area.

What is claimed is:

1. An article sorter conveyor system comprising at least two conveyors of which at least one is a sorting conveyor provided with diverter means located at several places along said sorting conveyor and being operable to divert articles from said sorting conveyor in response to actuator means therefor being selectively operated, the other of said conveyors having a partial length thereof extending closely along a partial length of said sorting conveyor substantially parallel therewith, said conveyors being driven at equal velocities, article transfer means being provided adjacent said partial lengths and being operable to participate in the movement of the conveyors and to deplace articles from one conveyor to the other by a movement substantially perpendicular to the moving direction of the conveyors, said system including destination code register means operable to receive a destination code for each article fed to the first of said conveyors as seen in the direction of movement thereof, to advance said destination code in synchronism with the movement of the conveyors, and to operate said actuator means at a selected position along the sorting conveyor in response to the code of the article being advanced to a corresponding stage in said register means.

2. A sorter conveyor system as claimed in claim 1, in which said diverter means and said article transfer means are of uniform design.

3. A sorter conveyor system as claimed in claim 1, in which one of said conveyors is a first feeding conveyor operable to receive articles fed thereto from a feeding station and to advance said articles to a transfer station adjacent said partial length of the conveyor, said transfer station having permanently operative actuator means for said article transfer means whereby all articles advanced to said transfer station are automatically transferred to said sorting conveyor.

4. A sorter conveyor system as claimed in claim 3, in which there is provided at least one additional feeding conveyor operable to convey articles to another transfer station adjacent said sorter conveyor.

5. A sorter conveyor system as claimed in claim 3, in which there is provided at least one further feeding conveyor operable to receive articles fed thereto from a further feeding station and to convey these articles to a further transfer station located adjacent said first feeding conveyor and having permanently operative actuator means for said article transfer means of said further feeding conveyor whereby all articles advanced to said further transfer station are automatically transferred to said first feeding conveyor and therefrom further to said sorting conveyor.

6. A sorter conveyor system as claimed in claim 1, in which said at least two conveyors comprise two sorting conveyors.

7. A sorter conveyor system as claimed in claim 1, in which at least a first conveyor is of the laterally tiltable slat-belt type and said partial length thereof is located in a level higher than that of the said partial length of a second conveyor.

8. A sorter conveyor system as claimed in claim 1, in which the conveyors are of the endless-belt type each passing around sprockets at the ends thereof and having an upper run and a lower run, said sprockets having their axes mutually inclined so as to provide for said upper runs running closely together and said lower runs being spaced laterally from each other.

9. A sorter conveyor system as claimed in claim 8, in which one of the conveyors is of the laterally tiltable slat-belt type, having a lower run located underneath and laterally offset from an upper run, and further having slat tilting control means for controlling the lateral angular position of said slats at any place along the upper run, said tilting control means being operable to maintain said slats in a substantially horizontal position until the slats successively reach a position in which they are caused to respectively tilt in response to the operation of said actuator means upon reaching stationary means for effecting slat tilting for article transfer purposes.

* * * * *